FIG. I

INVENTOR.
RICHARD LEBARON BOWEN, JR.
BY
*Barlow & Barlow*
ATTORNEYS

March 10, 1970  R. L. BOWEN, JR  3,499,633
MIXING DEVICE
Filed Nov. 27, 1967  4 Sheets-Sheet 2
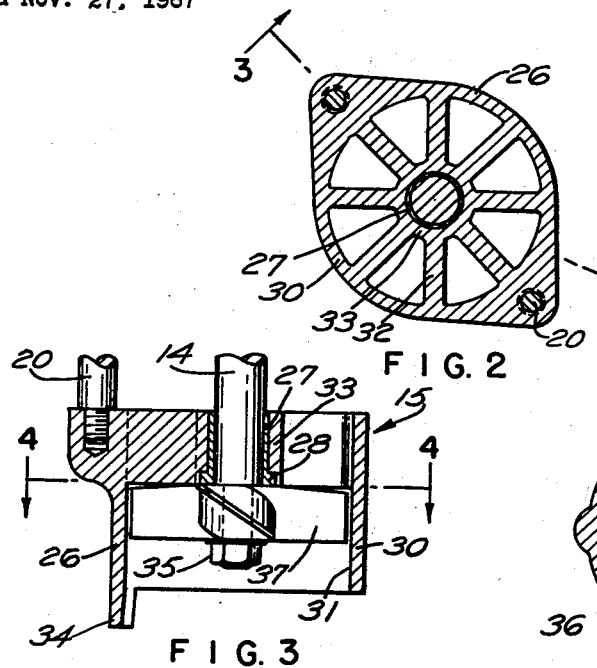
FIG. 2
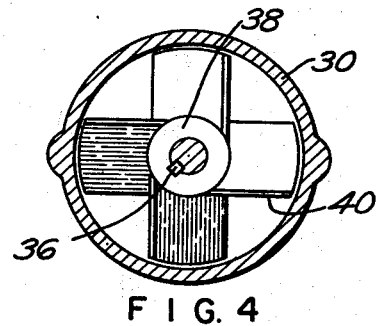
FIG. 3
FIG. 4
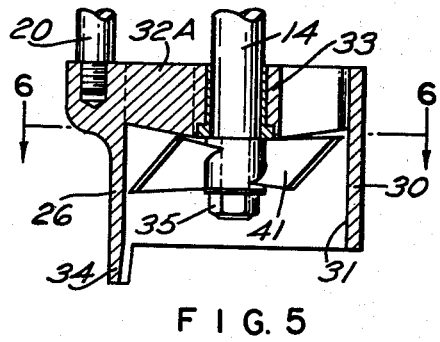
FIG. 5
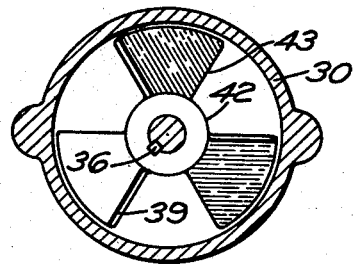
FIG. 6
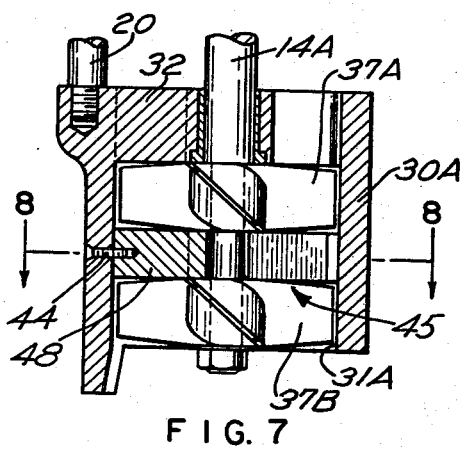
FIG. 7
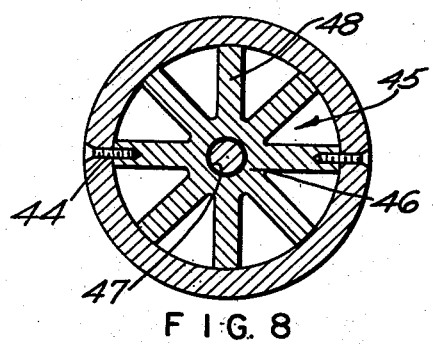
FIG. 8
INVENTOR.
RICHARD LEBARON BOWEN, JR.
BY
*Barlow & Barlow*
ATTORNEYS INVENTOR.
RICHARD LEBARON BOWEN, JR.
BY
Barlow + Barlow
ATTORNEYS

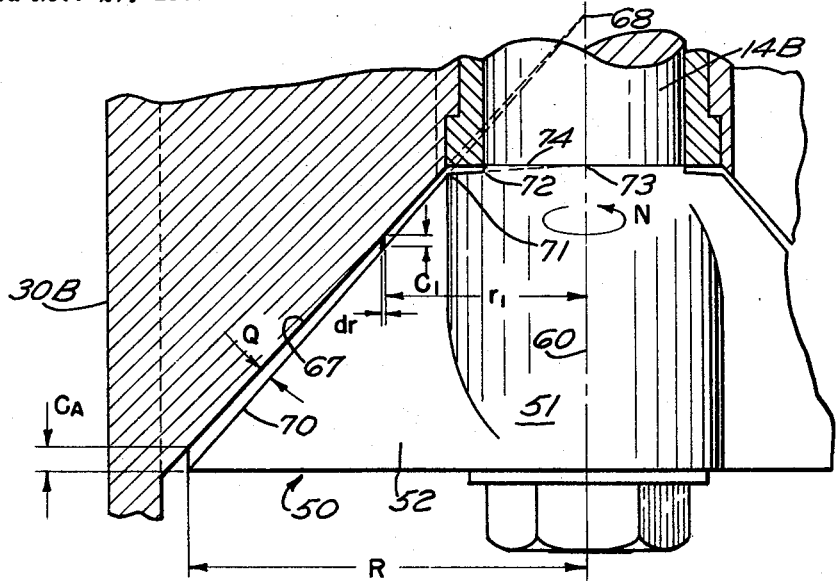
FIG. 16
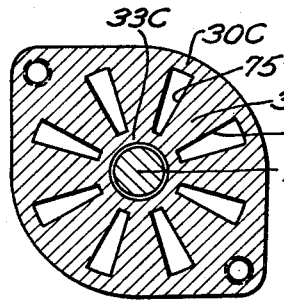
FIG. 17
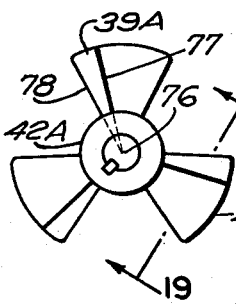
FIG. 18
FIG. 19
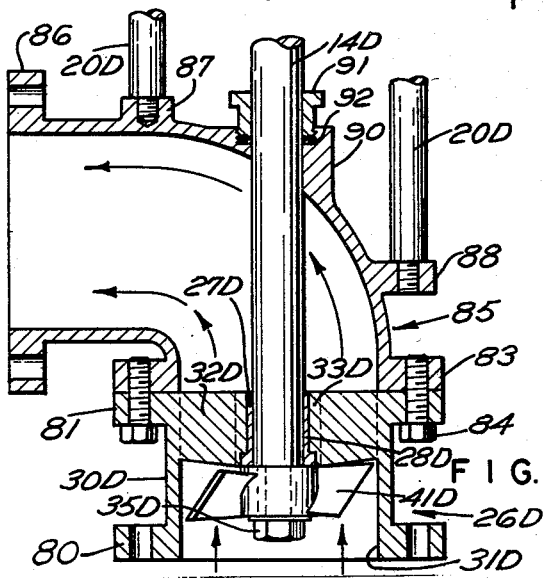
FIG. 20
FIG. 21
INVENTOR.
RICHARD LEBARON BOWEN, JR
BY
*Barlow + Barlow*
ATTORNEYS

United States Patent Office 3,499,633
Patented Mar. 10, 1970

3,499,633
MIXING DEVICE
Richard L. Bowen, Jr., 35 Fessenden Road,
Barrington, R.I. 02806
Filed Nov. 27, 1967, Ser. No. 685,753
Int. Cl. B01f 5/12
U.S. Cl. 259—95                    21 Claims

ABSTRACT OF THE DISCLOSURE

A mixing device for blending, dispersing, emulsifying, or the like of two liquids which may be immersed in the liquids to be mixed and which applies a primary shearing action to the fluid mixture as it passes through the apparatus by providing a housing with a number of radial vanes defining channels and an impeller cooperating with the vanes and having a small clearance below said vanes. The structure provides a constant shear rate throughout the shearing area.

BACKGROUND OF THE INVENTION

Previously, mixers of this type have produced varying rates of shear throughout the shear areas so that only minuscule amounts of fluid receive the maximum shear rate on each pass through the mixer.

SUMMARY OF THE INVENTION

An apparatus which produces constant shear rates throughout the whole shearing zone and high performance shearing in the shearing zone to obtain a faster mixing action for given rates of rotation.

BRIEF DESCRIPTION OF THE DRAWINGS

FIG. 2 is a section of the mixing head of FIG. 1 taken on line 2—2;

FIG. 3 is a section of one form of the mixing head taken on line 3—3 of FIG. 2;

FIG. 4 is a section of FIG. 3 taken on line 4—4;

FIG. 5 is a sectional modification of FIG. 3 taken on line 3—3 of FIG. 2;

FIG. 6 is a section of FIG. 5 taken on line 6—6 just above the impeller;

FIG. 7 is a further modification of FIGS. 3 and 5 taken on lines 3—3 of FIG. 2;

FIG. 8 is a section of FIG. 7 taken on line 8—8;

FIG. 16 is a diagram showing the location of the clearances (axial) in cases where there are no radial clearances;

FIG. 17 shows a section of a modification in the design of the vanes over those shown in FIG. 2 and may be considered taken on line 2—2 of FIG. 1;

FIG. 18 is a plan of a modification of the design of an impeller over one shown in FIG. 6;

FIG. 19 is a section across the end of one of the blades of the impeller of FIG. 18;

FIG. 20 is a section of a modification in the housing shown in FIG. 5 incorporating a discharge elbow;

FIG. 21 is a section of a further modification showing a mixing head enclosed in a sealed mixing vessel.

DESCRIPTION OF THE PREFERRED EMBODIMENTS

Figure 1:
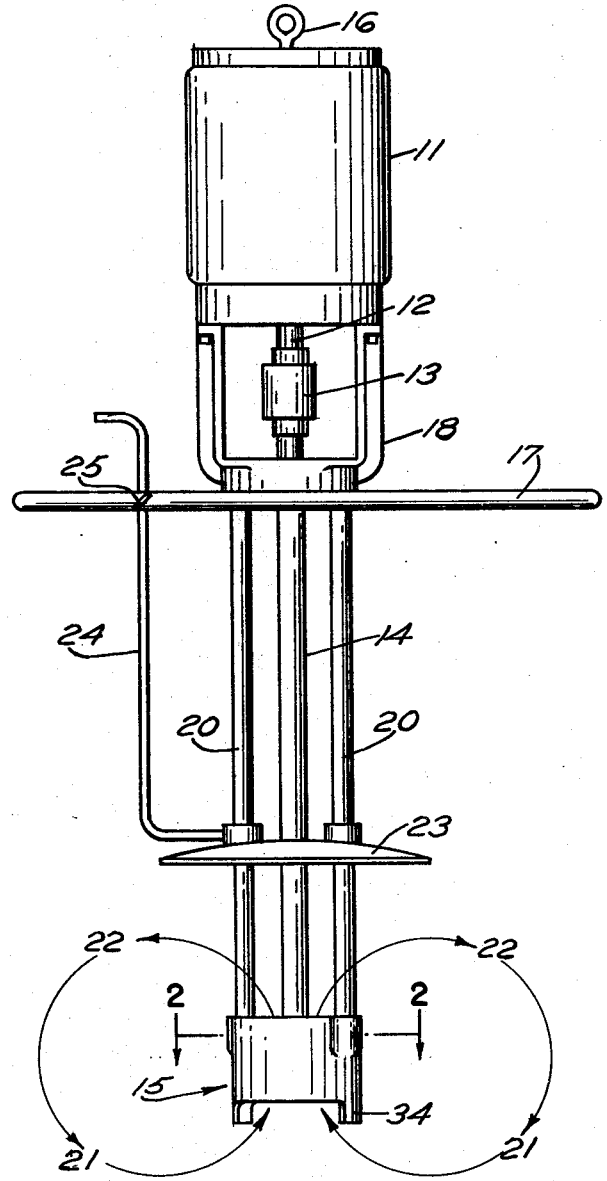
FIG. 1 is an elevational view of one from of a complete mixer.

Referring to the drawings, there is in FIG. 1 a general representation of the mixer, which is arranged for insertion into the top of an open mixing vessel. Motor 11 is provided with shaft 12 which has fixed to it coupling 13 which is in turn fixed to drive shaft, or rotor shaft, 14 which rotatively enters mixing head 15. The mixer may be supported in the vessel by hanging from eyebolt 16 or by allowing support 17 to rest on the sides of the vessel. Fixed to support 17 is frame 18 to which is fixed motor 11 and which has fastened to it at the opposite end rods 20, by means shown in FIGS. 2 and 3. Fluid enters mixing head 15 at the bottom as at 21 and is discharged from the top as at 22. Discharging fluid 22 is deflected by deflector plate 23 slidably mounted on rods 20 and held by handle 24 which may be fixed against movement by thumb screw 25.

The construction of the mixing head is plainly shown in FIGS. 2 to 5. There is a housing 26 which has fixed to it rods 20 at two points, and at the center of housing 26 is located bore 27 which has fixed in it bearing 28. Housing 26 consists of what amounts to an outer cylindrical member 30, which has an unobstructed bore 31 in the bottom part, but which at the top has a multiplicity of inwardly projecting vanes 32 joining outer cylindrical member 30 with what may be considered an inner cylindrical member 33 which contains bore 27 which is coaxial with and parallel to bore 31. Projecting from the bottom of outer cylindrical member 30 are two feet 34 whose purpose is to prevent the suction from being starved by member 30 being located too close to the bottom and in effect being shut off.

Fixed to the bottom of rotor shaft 14 by means of nut 35 and key 36 is an impeller generally shown by reference character 37, consisting of hub 38 with four blades 40 made of flat uniformly wide members set at an angle to a plane through the axis of shaft 14. In the modification shown in FIGS. 5 and 6 impeller generally shown by reference character 41 is comprised of hub 42 with fan shaped blades 43 also set at an angle. Impellers 37, 41 may be considered as rotors, and housing 26 may be called a stator with stator vanes 32A.

A further modification is shown in FIGS. 7 and 8, where two impellers 37A, 37B are positioned within bore 31A of outer cylindrical member 30A. Fixed within bore 31A and located between the two impellers 37A, 37B by means of screws is an element generally indicated by 45 (FIG. 8). Element 45 consists of cylindrical portion 46 provided with bore 47 and also provided with a number of outwardly extending vanes 48. Element 45 constitutes intermediate stator vanes.

Figure 9:
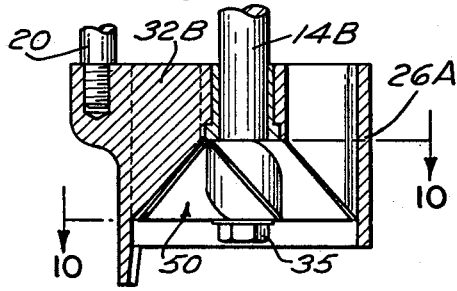
FIG. 9 is a further sectional modification of FIG. 3 and is taken on line 3—3 of FIG. 2.
Figure 10:
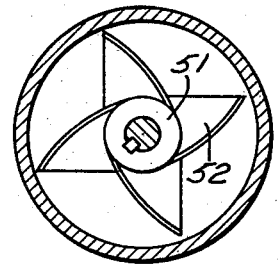
FIG. 10 is a section of FIG. 9 taken on a line 10—10 which passes just above the impeller.

Another modification of the device is shown in FIGS. 9 and 10. In FIG. 3 the angle between the bottom edges of the vanes 32 and the axis of the rotor shaft is 90° so that the bottom edges lie on a plane at right angles to the axis. In FIG. 5 the angle between the rotor shaft axis is less than 90° so that the surface generated by the vanes is a circular section of a downwardly pointing cone. In FIG. 9 the angle between the bottom edges of the vanes 32B and the axis of rotor shaft 14B is considerably greater than 90°, so that the surface generated by the bottom edges of the vanes is now a circular section of an upwardly pointing cone. A section through the top portion at the level of the rod 20 holes is still identical to FIG. 2. Fixed to rotor shaft 14B is an impeller generally indicated by 50, consisting of hub 51 with a number of blades 52 set at an angle to a plane through the axis of shaft 14B.

Figure 11:
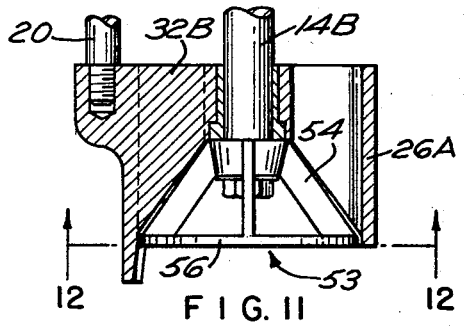
FIG. 11 is another modification of FIG. 3 and is taken on line 3—3 of FIG. 2.

A modification of FIG. 9 is shown in FIG. 11. Here housing 26A and vanes 32B are essentially as in FIG. 9. Positioned at the end of shaft 14B is impeller 53, consisting of a number of blades 54 fixed at one end to hub 55 and fixed at their opposite end to ring 56. In contrast to the blades 52 of impeller 50, the blades 54 of impeller 53 are not set at an angle, but are located on a plane which passes through the axis of shaft 14B.

Figure 13:
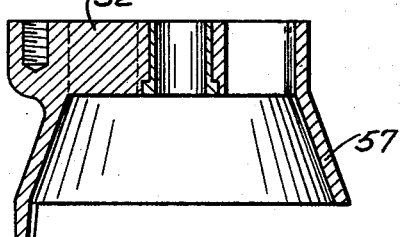
FIG. 13 is a sectional modification of the housing shown in FIG. 3.
Figure 14:
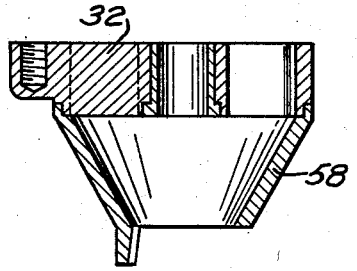
FIG. 14 is a sectional modification of the housing shown in FIG. 3.

Modifications may also be made in the shape of the outer cylindrical member 30 in FIGS. 3, 5 and others. In FIG. 13 the cylindrical section 57 below the bottom edges of vanes 32 flares out, while in FIG. 14 the cylindrical section 58 below the vanes 32 necks in. Both 57 and 58 are circular sections of hollow frusto-cones. Impellers such as 37, 41 may be located in these sections 57, 58 with their ends contoured to fit the sloping sides of 57, 58.

Figure 12:
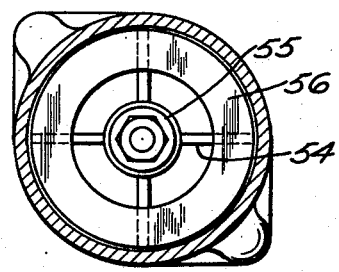
FIG. 12 is a section of FIG. 11 taken on line 12—12.

Vanes 32, 32A, 32B and 48 are located on planes which pass through the central axis of rotor shaft 14, 14A, 14B. These vanes may be inclined to the axis of the rotor shaft without deviating from the spirit of the invention. Or they may describe helical paths around inner cylindrical member 33. Likewise, the blades of impellers 37, 41, 37A, 37B may be contoured to provide additional efficiency, or improved performance. The actual design of these impellers and the associated vanes should be considered from the principles of hydrodynamic design applicable to axial flow pumps, since that is what is technically shown in FIGS. 3, 5, 7 and 9. On the other hand the impeller 53 shown in FIG. 11 is technically of the centrifugal type since fluid is impelled radially from 54 before moving axially between vanes 32. Therefore, the principles applying to centrifugal impeller design should be applied here. To this end, the blades shown in the plan view as in FIG. 12 may be given a spiral sweep from hub 55 to ring 56, and they may also be inclined. The structures illustrated here are intended to show in a general way variations of the general type of mixer with channels for receiving fluid which is caused to pass by associated pump means.

Figure 15:
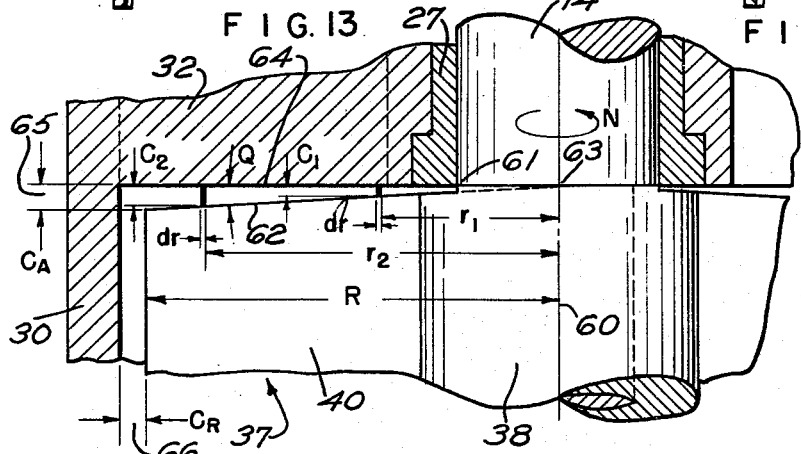
FIG. 15 is a diagram showing the location of the axial and radial clearances.

It should be noted that in FIGS. 3, 5, 7, 9 and 11 the clearances between the rotors and the stator vanes are shown as angular clearances, rather than the uniform parallel clearances known on and shown in all prior art. This is shown in detail in FIG. 15 for the structure shown in FIG. 3. Here, shaft 14 with hub 38 of impeller 37 with blade 40 is positioned below vane 32 connected to outer cylindrical member 30. Shaft 14 has a central axis 60. Mathematically the clearance between the impeller 37 and the stator vanes 32 should be angular. The correct layout of the angular clearance follows. As pointed out above, the bottom edges 64 of vanes 32 in FIG. 3 are at right angles to the axis of shaft 14. As shown in FIG. 15 the top edges 62 of blades 40 of impeller 37 are on a line which intersects line 64 at the axis 60 as at 63. The reason why this must be so will be described presently. Let shaft 14 have a rotational speed of N revolutions per second. Impeller 37 has a radius R. Consider an infinitesimally thin segment of thickness $dr$ at a distance $r_1$ from axis 60. This segment will have a clearance between 62 and 64 of $C_1$. The rate of shear $D_1$ of the segment of fluid $dr$ at $r_1$ equals the linear velocity divided by the gap:

$$D_1 = 2\pi r_1 N / C_1$$

When $r_1$ and $C_1$ are in the same units, as inches or feet, $D_1$ equals the conventional shear rate in reciprocal seconds, sec.$^{-1}$. Now take the case where segment $dr$ is located a distance $r_2$ from the axis 60.

$$D_2 = 2\pi r_2 N / C_2$$

If we assume that $r_2$ is two times $r_1$, then by the geometry $C_2$ must likewise be two times $C_1$. A look at equations for $D_1$ and $D_2$ will show for $r_2 = 2r_1$ the two shear rates are identical. This will be true at any $r$, since $C/r$ is the same at any $r$. In FIG. 15 the axial clearance 65 is $C_A$ at the impeller ODR. The radial clearance 66 is $C_R$ as shown at 66. For small clearances the shear rate in $C_R$ is almost equivalent to that at $C_A$ when $C_R = C_A$. It should be noted that the clearance starts at the surface of shaft 14 with a finite amount as at 61.

In the mixing of fluid materials in the type of mixers described here one often encounters non-Newtonian fluids. It is very important to know the shear rate, and in virtually every case it is desirable to have the shear rate uniform. The angular clearance described here maintains the shear rate in the high shear zones (the clearances between the rotor and stator) virtually constant. A fixed height parallel clearance obviously produces a maximum shear rate at the OD of the impeller, with progressively lower shearing rate as one goes towards the axis of the rotor. If the shear rate at the OD is not excessive with the parallel clearance, then the bulk of the material is being sheared at rates which can drop to one fifth (or less) of the maximum. Obviously an angular clearance will produce maximum efficiency.

In FIG. 16 there is the case of the structure shown in FIG. 9 having shaft 14B with impeller 50 fixed to it. Hub 51 has blades 52 positioned below vanes 32 which are connected to outer cylindrical member 30B. In this case the bottom edge 67 of vane 32 is extended to axis 60 as at 68. The top edge 70 of blade 52 intersects axis 60 at 68, giving an axial clearance of $C_A$ at the impeller OD of R. As before, if R is $2r_1$, then $C_A$ equals $2C_1$, and the shear rate of $dr$ is the same at $r_1$ and R. There is a little offset between 71, 72 which is a continuation of line 70, line 71-72 being extended to 60 will intersect line 74 at the axis 60, as at 73.

It will be illustrative to show the magnitude of shear rates present in these mixers. Take an impeller as 37 or 50 of 4 inches in diameter turning at 3600 r.p.m., which gives a tip speed (at R) of 7,536 inches/second. With a gap $C_A$ of $\frac{1}{64}$" we have a shear rate of about 48,000 sec.$^{-1}$. With the angular clearances illustrated in this description, this would be uniform throughout the shear zones. Some prior art has recommended fixed clearances, as .005 inch, without reference to impeller diameter. Diameter must be considered.

In FIGS. 3 and 5 there is one axial and one radical shear zone. On the other hand, the mechanisms shown in FIGS. 9 and 11 have a single axial shear zone. The device in FIG. 7, however, has three axial shear zones and two radical zones. By following the principles outline above for dimensioning the axial and radial clearances, the shear rate may be made the same in all zones.

A further refinement may be made to the mixing device disclosed here as shown in FIGS. 17 to 19. It has been shown that with the angular clearances recommended the shear rate is at all times constant or nearly so in the major shear zones. However, the amount of time which any slug of fluid is sheared decreases as one goes from the hub of the impeller to the OD of the impeller. This is because of two geometrical details of construction. First, the width of the vanes 32 is constant between the inner cylindrical member 33 and outer cylindrical member 30 so that the vane sides are parallel, as in FIG. 2. Further, the surfaces of the impellers which are contiguous with the lower edges of the vanes are also parallel, as at 39 on impeller 41 shown in FIG. 6. It will be evident that the outside edge of surface 39 of blade 43 takes less time to cross vane 32 than the inside edge of surface 39 near hub 42.

The time for one side of surface 39 to cross the vane may be made constant at all points by making the vane thicker at the outside edge as shown in FIG. 17. Here the outer cylindrical member 30C and inner cylindrical member 33C have vanes 32C joining the two radially, with the width of vane 32C being greatest at the juncture with outer cylindrical member 30C. The width of vanes 32C may be such that a parallel surface as 39 on blade 43 of FIG. 6 will take the same time to cross the vane at all points. On the other hand, the sides 75 of vanes 32C may lie on lines which pass through the rotational axis of the impeller as at 76. The time for a parallel edge 39 of an impeller to pass over the vane now will still be greatest near the outer cylindrical member 30C. In such a case the edge 39 of the impeller must be modified also as shown in FIG. 18. Here the surface widens as we go towards the outside diameter. The sides 77, 78 bounding the surface 39A in FIG. 18 also lie on lines which pass through the impeller axis 76. When lines 75, 77, 78 all pass through axis 76, the time it takes any radial segment of differential thickness as *dr* of surface 39A to pass over van 32C is the same. This can be explained in another way: when the leading portion 77 of surface 39A passes over vane 32C it is lined up with line 75, and then the trailing portion 78 crosses the other line 75 it is likewise aligned. An impeller can be designed for equal shearing times when used with parallel vanes as of FIG. 2. In such a case, the outside of surface 39A of FIG. 18 is made somewhat wider than the radial segment shown in FIG. 18, while the inside near the hub is made thinner. FIG. 19 shows a section through the end of blade 43A giving an idea of the general shape. Surface 39A is flat in such a section only when the surface is at right angles to the rotor axis; otherwise concave or convex. It is important to have the shearing time constant in some instances. However, more important is the fact that the analysis of the shearing times above shows how to get more efficient operation from the equipment. Mixing equipment of the type described here produces the major part of the mixing process, whether dispersion, emulsification, or homogenization, by means of shear action. If the time of shear in any part of the equipment can be increased, the processing time for the operation is decreased. It should be noted that thickening the outside ends of the vanes to the extent shown in FIG. 17 reduces the area of the channels defined by the vanes 32C, and thus may restrict the flow. However, one would accept reduced flow if the shear could be increased substantially. It would not be expected that thickening the edge 39A in FIG. 18 would decrease flow by itself, but it will obviously increase the shear time. This provides means to selectively increase the shearing time as well as increasing the shear rate.

A still further modification is shown in FIG. 20, which is specifically a variation of FIG. 5. A housing 26D with a centrally located bore 27D has fixed in it bearing 28D. Housing 26D contains what amounts to an outer cylindrical member 30D having an unobstructed bore 31D in the bottom part, but has a plurality of inwardly projecting vanes 32D joining outer cylindrical member 30D with what may be considered an inner cylindrical member 33D which contains bore 27D which is coaxial with and parallel to bore 31D. Fixed to the bottom of rotor shaft 14D by means of nut 35D and a key not shown is an impeller indicated by character 41D, which is similar to that shown in FIG. 6.

Housing 26D is provide with two flanges 80, 81 of circular cross section; flange 81 is connected by means of screws 84 to an identical flange 83 which forms one end of a 90° elbow generally indicated by 85. Flange 86 forms the other end of elbow 85. Two bosses 87, 88 arise from elbow 85 for threadedly receiving the screwed ends of rods 20D. A third boss 90 is recessed to receive packing nut 91 for compressing packing 92.

A final modification is shown in FIG. 21 having a vessel generally indicated by 100, comprising two halves 101 and 102, held together with screws. Fixed to half 102 by means of rods 103 is a mixing head generally indicated by 15A. The internals of this head may be any of the detailed head disclosures shown, or a combination of these. Also fixed to vessel half 102 by means of rods 103 is frame 104 for holding motor 105 which has shaft 106 coupled to rotor shaft 107 by means of coupling 108. Packing nut 110 is threaded into a recess in vessel half 102 for compressing packing 111. Vessel 100 has an inlet pipe 112 and a discharge pipe 113.

Operation of all variations shown is simple. In modifications shown from FIG. 1 to and including FIG. 20, the mixer may be inserted into the top of a vessel, and in such case operation is usually batchwise. This includes specifically FIG. 20, in which cases flanges 80 and 86 may be omitted to simplify the structure. In all cases the rotor shaft is revolved so that the impeller moves fluid into the bottom of housing 26, 26A, 26D and out the top of the housing. There are zones of high shear between the bottom of the vanes and the top of the impellers, and between the ends of the impellers and the housing. The material caught in these high shear zones is subjected to a constant rate of shear and then dispersed into the main fluid stream moving through the housing. The equipment may also be designed so that shearing time is constant.

In the case of FIG. 20, the mixer may be located outsider or adjacent to the mixing vessel. In such a case, flange 80 would be connected to a flanged pipe connected to the bottom of the vessel, and flange 86 would be connected to a flanged pipe connected to the top of the vessel. Operation again would probably to batchwise. In FIG. 21 the equipment is designed for continuously processing the fluids to be mixed. Here the fluids are pumped by auxiliary pump means into pipe 112 and discharged from pipe 113. Fluid inside vessel 100 enters the bottom of mixing head 115A and leaves the top, recirculating inside vessel 100.

I claim:

1. In an agitator, a housing with a vertical axis, said housing containing in the top part a number of channels orientated around said axis, a number of vanes between said channels, an impeller rotatably mounted on said axis below said vanes and within said housing for forcing fluid into the bottom of said channels whereby it discharges from the top of said housing, there being an angular axial clearance between the bottom of said vanes and the top of said impeller, the top of the impeller and the bottom of the vanes being closely contiguous, the angle of said clearance having its apex substantially on said vertical axis whereby a high rate of shear is obtained.

2. In an agitator as in claim 1 wherein there is a radial clearance between the ends of said impeller and said housing, said radial clearance equalling said angular clearance at the outside diameter of said impeller.

3. In an agitator as in claim 2 wherein said impeller has a surface adjacent to the bottom of said vanes, said surface being generated by a series of circumferences whose radii progressively increase from said vertical axis, the width of said surface increasing in going towards the outside diameter of said impeller.

4. In an agitator as in claim 1 wherein said housing being comprised of an outer cylindrical member and an inner cylindrical member, said vanes radially connecting said outer cylindrical member with said inner cylindrical member, said impeller being rotatably mounted within said outer cylindrical member, and the width of said vanes increasing from said inner cylindrical member to said outer cylindrical member.

5. In an agitator as in claim 4 wherein there is a radial clearance between the ends of said impeller and said housing, said radial clearance equalling said angular clearance at the outside diameter of said impeller.

6. In an agitator as in claim 4 wherein the sides of said vanes being located on lines which radiate from said axis so that said vanes increase in width in going from said inner cylindrical member to said outer cylindrical member, said impeller having a surface adjacent to the bottom of said vanes generated by a series of circumferences whose radii progressively increase from said vertical axis, the sides of said surface lying on lines which radiate from said axis so that the width of said surface increases in going towards the outside diameter of said impeller.

7. In an agitator as in claim 4 wherein said impeller has a surface adjacent to the bottom of said vanes generated by a series of circumferences whose radii progressively increase from said vertical axis, the width of said surface increasing in going towards the outside diameter of said impeller.

8. In an agitator as in claim 7 wherein there is an axial clearance between the top of said impeller surface and the bottom of said vanes and a radial clearance between the ends of said impeller and said housing, said radial clearance equalling said axial clearance at the outside diameter of said impeller.

9. An agitator as in claim 8 wherein the sides of said vanes and the sides of said impeller surface lie on lines which radiate from said axis.

10. An agitator as in claim 4 wherein the sides of said vanes lie on lines which radiate from said axis.

11. An agitator as in claim 1 wherein said impeller has a surface adjacent to the bottom of said vanes, said surface being generated by a series of circumferences whose radii progressively increase from said vertical axis, the width of said surface increasing in going towards the outside diameter of said impeller.

12. In an agitator, a housing with a vertical axis, said housing containing in the top part a number of channels orientated around said axis, a number of vanes between said channels, an impeller rotatably mounted on said axis below said vanes and within said housing for forcing fluid into the bottom of said channels whereby it discharges from the top of said housing, means comprising the shaping of said vanes and impeller to provide a zone of high shear between the bottom of said vanes and the top of said impeller, said means maintaining the rate of shear in said zone constant.

13. An agitator as in claim 12 wherein said means of high shear is between the bottom of said vanes and the top of said impeller and also between the ends of said impeller and said housing.

14. An agitator as in claim 13 wherein there are means for maintaining the time of shear in said zone constant.

15. An agitator as in claim 12 wherein there are means for maintaining the time of shear in said zone constant.

16. In an agitator, a housing with a vertical axis, said housing containing in the top part a number of channels orientated around said axis, a number of vanes between said channels, an impeller rotatably mounted on said axis below said vanes and within said housing for forcing fluid into the bottom of said channels whereby it discharges from the top of said housing, said impeller having a surface adjacent to the bottom of said vanes, said surface being generated by a series of circumferences whose radii progressively increase from said vertical axis, the width of said surface increasing in going towards the outside diameter of said impeller.

17. An agitator as in claim 16 wherein the sides of said impeller surface lie on lines which radiate from said axis.

18. In an agitator, a housing with a vertical axis, said housing being comprised of an outer cylindrical member and an inner cylindrical member, a number of vanes radially connecting said outer cylindrical member with said inner cylindrical member, an impeller rotatably mounted on said axis below said vanes and within said outer cylindrical member, said vanes forming channels whereby said impeller may force fluid into the bottom of said channels and discharge fluid from the top of said housing, said impeller having a surface adjacent the bottom of said vanes closely contiguous thereto, the width of said vanes increasing from said inner cylindrical member to said outer cylindrical member to maintain the time of shear between the bottom of the vanes and the top of the impeller constant.

19. An agitator as in claim 18 wherein the sides of said vanes lie on lines which radiate from said axis.

20. An agitator as in claim 18 wherein said impeller has a surface adjacent to the bottom of said vanes generated by a series of circumferences whose radii progressively increase from said vertical axis, the width of said surface increasing in going towards the outside diameter of said impeller.

21. An agitator as in claim 20 wherein the sides of said vanes and the sides of said impeller surface both lie on lines which radiate from said axis so that the width of said vanes and the width of said surface both increase in going towards the outside diameter of said impeller.

References Cited

UNITED STATES PATENTS

| | | | |
|---|---|---|---|
| 2,772,863 | 12/1956 | Harney | 259—95 X |
| 3,163,405 | 12/1964 | Balassa | 259—97 |
| 3,229,965 | 1/1966 | Hill | 259—95 |
| 3,251,580 | 5/1966 | Adams | 259—95 |

ROBERT W. JENKINS, Primary Examiner